(12) United States Patent
Lo et al.

(10) Patent No.: US 12,259,605 B2
(45) Date of Patent: Mar. 25, 2025

(54) SEMICONDUCTOR DEVICE AND METHOD FOR MANUFACTURING THE SAME

(71) Applicant: TAIWAN SEMICONDUCTOR MANUFACTURING COMPANY LTD., Hsinchu (TW)

(72) Inventors: Wen-Shun Lo, Hsinchu County (TW); Yingkit Felix Tsui, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 452 days.

(21) Appl. No.: 17/695,837

(22) Filed: Mar. 16, 2022

(65) Prior Publication Data

US 2023/0296928 A1   Sep. 21, 2023

(51) Int. Cl.
G02F 1/01 (2006.01)
G02F 1/025 (2006.01)

(52) U.S. Cl.
CPC ............ *G02F 1/025* (2013.01); *G02F 1/0147* (2013.01); *G02F 2201/063* (2013.01)

(58) Field of Classification Search
CPC ... G02F 1/025; G02F 1/0147; G02F 2201/063
USPC ........................................................ 385/1–3
See application file for complete search history.

(56) References Cited

U.S. PATENT DOCUMENTS

| | | | |
|---|---|---|---|
| 2003/0040135 A1* | 2/2003 | Trammel | G02F 1/0147 438/29 |
| 2011/0170161 A1* | 7/2011 | Gill | G02F 1/025 359/259 |
| 2014/0193113 A1* | 7/2014 | Akiyama | G02F 1/015 427/163.2 |
| 2015/0316794 A1* | 11/2015 | Hayakawa | G02F 1/0121 385/2 |
| 2018/0188632 A1* | 7/2018 | Celo | G02F 1/225 |
| 2021/0318561 A1* | 10/2021 | Sakib | G02B 6/136 |

OTHER PUBLICATIONS

S. Y. Siew et al., "Review of Silicon Photonics Technology and Platform Development," Journal, Jul. 1, 2021, 16 pages, vol. 39, No. 13.

\* cited by examiner

*Primary Examiner* — Robert Tavlykaev
(74) *Attorney, Agent, or Firm* — WPAT LAW; Anthony King

(57) ABSTRACT

A semiconductor device and a method of manufacturing the same are provided. The semiconductor device includes a semiconductor substrate, a first dielectric layer, a second dielectric layer, a light modulator, a heater, and a first conductive contact. The first dielectric layer is disposed on the semiconductor substrate. The second dielectric layer is disposed on the first dielectric layer. The light modulator is disposed in the first dielectric layer. The heater is disposed in the second dielectric layer and above the light modulator. The first conductive contact is electrically connected to the light modulator. A top surface of the heater is coplanar with a top surface of the first conductive contact.

20 Claims, 24 Drawing Sheets

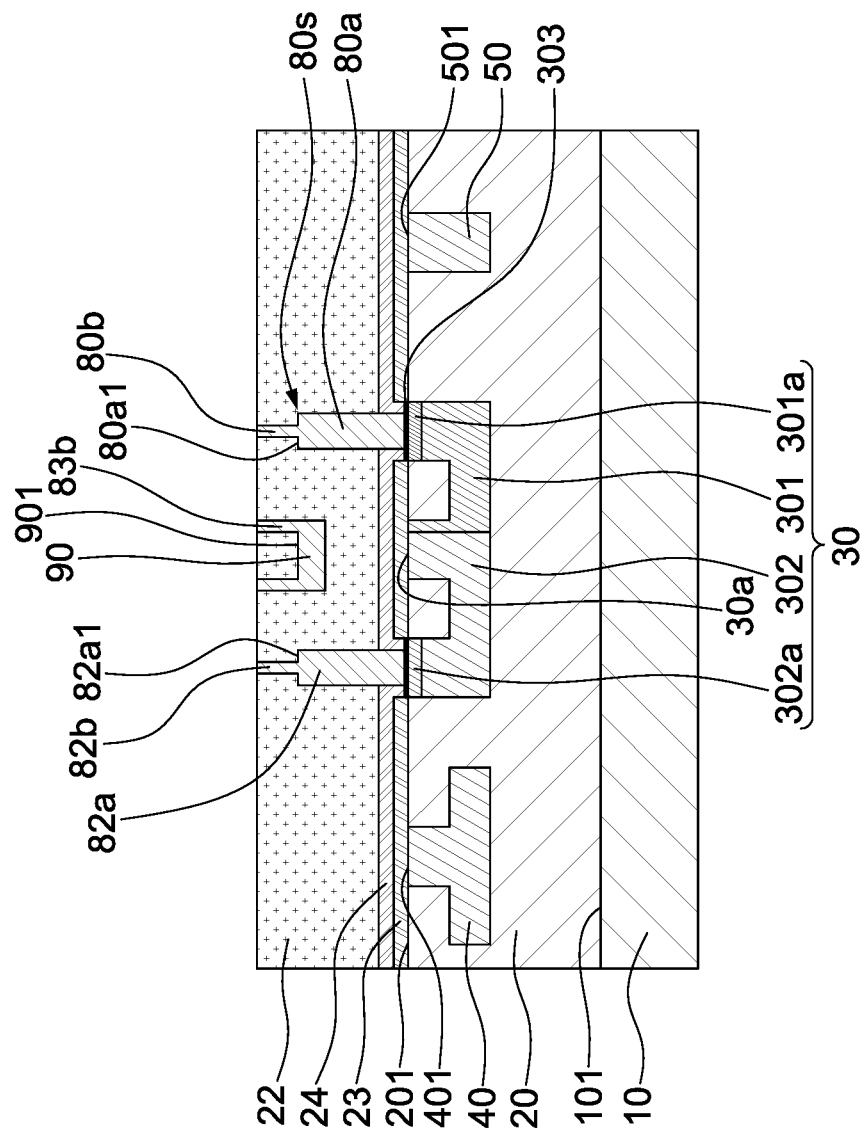

SEMICONDUCTOR DEVICE AND METHOD FOR MANUFACTURING THE SAME

TECHNICAL FIELD

The present disclosure relates, in general, to semiconductor devices and methods for manufacturing the same. Specifically, the present disclosure relates to semiconductor devices with multiple optical elements and a tungsten heater together with tungsten plug contacts, and method for manufacturing the same.

BACKGROUND

A semiconductor structure may include multiple optical elements providing the optical link for data communication. In addition, recent information technology advances, such as Big Data, cloud computation, cloud storage, and Internet of Things, have driven exponential growth of data communications in high performance computers, data centers, and long-haul telecommunication. Silicon photonics is poised to provide a fast on-chip and off-chip optical link for data communication at low cost and high energy efficiency.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

FIGS. 2a, 2b, 2c, 2d, 2e, 2f, 2g, 2h, 2i, 2j, and 2k illustrate a method for manufacturing a semiconductor device, in accordance with some embodiments of the present disclosure.

DETAILED DESCRIPTION

Figure 1:
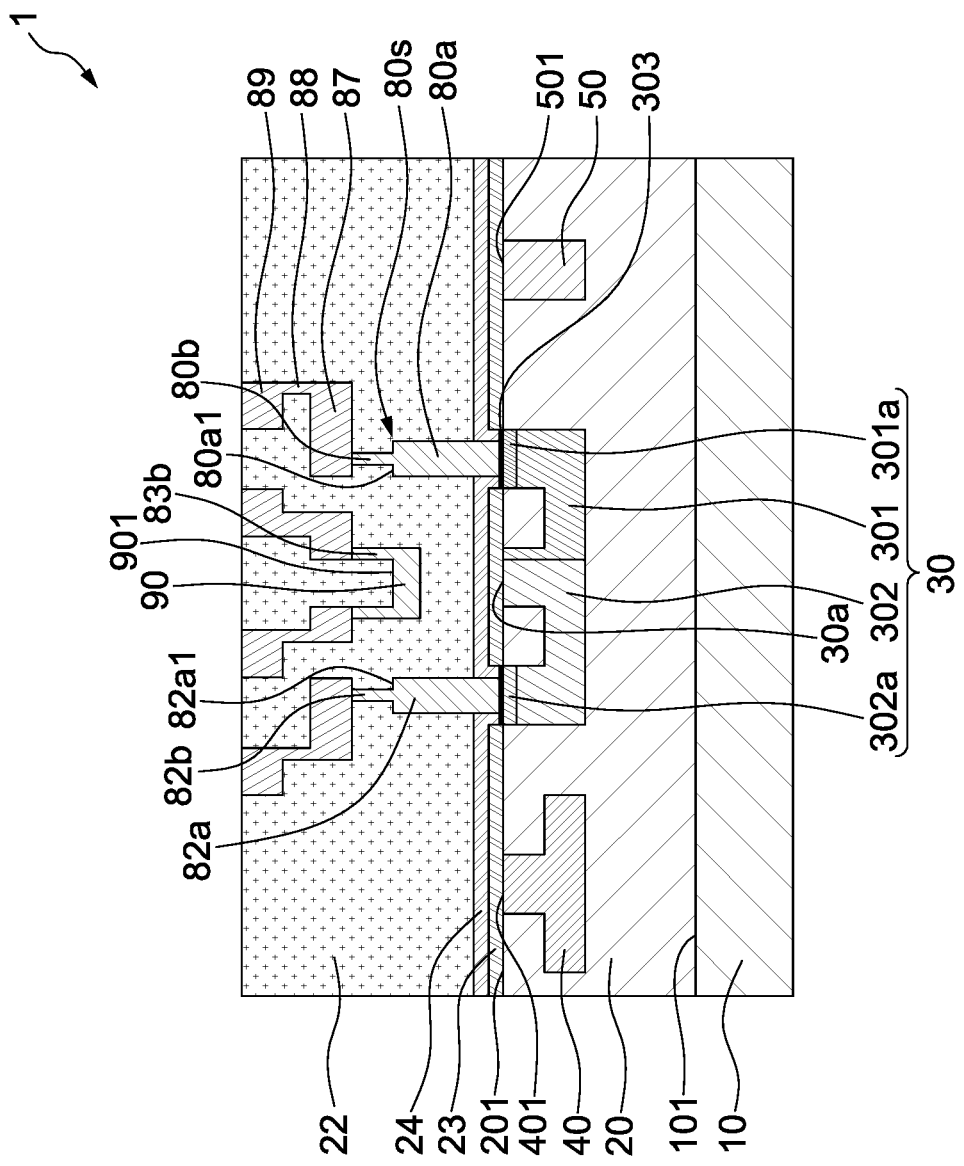
FIG. 1 is a diagram of a semiconductor device in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A method to form a metal heater defines a metal heater (e.g., TiN) by etching before contact formation, so that the heater can be connected to the back end-of-line ("BEOL") through the contact. As such, a metal etching tool is required for the etching definition of the heater before contact. In CMOS foundry process, however, no metal etching is provided before formation of the contact. Therefore, a dedicated etching tool for performing heater definition in Si photonics is needed. Use of a dedicated etching tool, however, is not economical. What is thus required is a heater formation process more compatible with CMOS foundry process.

Some exemplary operations of formation of optical elements and the heater are disclosed as follows. An exemplary metal formation operation for forming a heater by chemical-mechanical planarization (CMP) together with tungsten metal contact is fully compatible with a CMOS foundry processes. In addition, a second contact on the tungsten metal contact is formed to connect the tungsten heater to the BEOL. Exemplary operations for formation of the tungsten heater are simple and economical, especially compared formation with Titanium nitride (TiN), which is considerably more is complex, costly, and incompatible with general CMOS process. In some embodiments, the conductive contacts formed with the exemplary metal formation operations also include a specific stepped structure. Distance between the tungsten heater and a light modulator can be appropriately adjusted and light modulating function of a modulator is better controlled by the tungsten heater.

FIG. 1 is diagram of a semiconductor device 1 in accordance with some embodiments of the present disclosure. FIG. 1 shows a semiconductor device 1. The semiconductor device 1 includes a semiconductor substrate 10, a first dielectric layer 20, a second dielectric layer 22, a light modulator 30, a first waveguide 50, a second waveguide 40, a heater 90, first conductive contacts 80a and 82a, and second conductive contacts 80b and 82b.

In the semiconductor substrate 10 as shown, some features have been omitted for simplification. For example, the semiconductor substrate 10 may include CMOS transistors or other electric components such as resistors, diodes etc. In some embodiments, the semiconductor substrate 10 includes several materials such as silicon, GaAs, germanium, silicon on insulator (SOI) or other suitable semiconductive materials.

The first dielectric layer 20 can be formed by various processes, such as chemical vapor deposition (CVD) or spin-coating. The first dielectric layer 20 covers the semiconductor substrate 10 and provides electrical insulation between the semiconductor substrate 10 and overlaid conductive features. The first dielectric layer 20 is disposed on the semiconductor substrate 10. The first dielectric layer 20 covers a top surface 101 of the semiconductor substrate 10. The first dielectric layer 20 includes dielectric materials such as silicon oxide ($SiO_2$), silicon nitride (SiN), SiCOH, a spin-on low-k dielectric material such as SiLK™, etc, or other suitable materials. In some embodiments, the thickness of the first dielectric layer 20 ranges from approximately 1.5 micrometers (μm) to 2 μm.

The light modulator 30 is disposed in the first dielectric layer 20. The light modulator 30 is embedded within the first dielectric layer 20. The thickness of the light modulator 30 (i.e., the distance between the top surface and the bottom surface of the light modulator 30) ranges from approximately 200 nanometers (nm) to 240 nm. The thickness of the first waveguide 50 and second waveguide 40 ranges from approximately 200 nm to 240 nm. Integrating a PN junction into a waveguide structure (such as the light modulator 30) enables a building block of a photonic integrated circuit of a phase modulator. The light modulator 30 is configured to modulate a frequency of light passing through the first waveguide 50. The light modulator 30 is configured to modulate a frequency of light passing through the second waveguide 40. The PN junction of the light modulator 30 is configured to modulate or adjust the photonics passing through the first waveguide 50 and the second waveguide 40.

The light modulator 30 includes a n-type doped region 301, a p-type doped region 302, a n-plus doped layer 301a disposed on the n-type doped region 301, and a p-plus doped layer 302a disposed on the p-type doped region 302. The n-plus doped layer 301a includes N type impurity dopant of high concentration and the p-plus doped layer 302a includes P type impurity dopant of high concentration. In some embodiments, the region 301 may be a n-minus doped region and the region 302 may be a p-minus doped region. A conductive silicide layer 303 is disposed on the p-plus doped layer 302a and the n-plus doped layer 301a. In some embodiments, the conductive silicide layer 303 includes cobalt-silicide (Co silicide), nickel-silicide (Ni silicide), or other suitable materials.

The first conductive contacts 80a and 82a are disposed on the conductive silicide layer 303. The first conductive contact 80a is electrically connected to the conductive silicide layer 303 and the conductive silicide layer 303 is electrically connected to the n-plus doped layer 301a. The first conductive contacts 80a and 82a include tungsten or other suitable material. If the first conductive contact 80a (e.g., including the tungsten) directly contacts the n-plus doped layer 301a, resistance will be high. If the first conductive contact 80a contacts the conductive silicide layer 303 and the conductive silicide layer 303 contacts the n-plus doped layer 301a, the resistance will be low.

The first waveguide 50 is embedded within the first dielectric layer 20. A top surface 201 of the first dielectric layer 20 is coplanar with a top surface 501 of the first waveguide 50 and a top surface 30a of the light modulator 30. The second waveguide 40 is embedded within the first dielectric layer 20. A top surface 401 of the second waveguide 40 is coplanar with the top surface 201 of the first dielectric layer 20 and the top surface 501 of the first waveguide 50. In some embodiments, the first waveguide 50 includes a strip waveguide and the second waveguide 40 includes a rib waveguide. In some embodiments, the top surface 501, the top surface 30a, and the top surface 401 are coplanar with the top surface 201. In some embodiments, the first waveguide 50, second waveguide 40 and light modulator 30 can be formed by shallow Si etching and deep Si etching of the first dielectric layer 20.

A third dielectric layer 23 is disposed between the first dielectric layer 20 and the second dielectric layer 22. A level of a top surface of the conductive silicide layer 303 is lower than a level of a top surface of the third dielectric layer 23. In some embodiments, an elevation level of the top surface of the conductive silicide layer 303 is lower than an elevation level of the top surface of the third dielectric layer 23. In some embodiments, the third dielectric layer 23 includes dielectric materials such as $SiO_2$, SiN, SiCOH, a spin-on low-k dielectric material, or other suitable materials. A fourth dielectric layer 24 is disposed on the third dielectric layer 23. The fourth dielectric layer 24 surrounds a portion of a side surface of the first conductive contacts 80a and 82a. The fourth dielectric layer 24 is disposed between the third dielectric layer 23 and the second dielectric layer 22. A portion of the fourth dielectric layer 24 is recessed from the top surface of the third dielectric layer 23 and is disposed in the third dielectric layer 23. In some embodiments, the fourth dielectric layer 24 includes dielectric materials such as SiN, or other suitable materials.

The second dielectric layer 22 is disposed on the first dielectric layer 20. In some embodiments, the second dielectric layer 22 includes the same material as the first dielectric layer 20. The heater 90 is disposed in the second dielectric layer 22 and disposed above the light modulator 30. In some embodiments, the heater 90 includes a material of tungsten (W). In some embodiments, the heater 90 can include nichrome, FeCrAl, Cupronickel (CuNi), or any other suitable materials.

The first conductive contacts 80a and 82a include material identical to that of the heater 90. The heater 90 is configured to control the photons transmitted in the light modulator 30 by increasing the temperature of the light modulator 30. The heater 90 is configured to adjust the frequency of the light passing through the light modulator 30 by increasing the temperature of the light modulator 30. The heater 90 is usually utilized in silicon photonics in use of the thermo-optic effects of Si to manipulate the photons within the waveguide (e.g., the function of the heater 90 would stabilize a micro-ring resonator and be used as a switch to control the modulator 30, . . . , etc.). A distance between a bottom surface of the heater 90 and a top surface of the fourth dielectric layer 24 ranges from approximately 3000 Angstrom (Å) to 12000 Å. The thickness of the heater 90 ranges from approximately 1500 Å to 3000 Å. The perpendicular length of the first conductive contacts 80a and 82a ranges from approximately 3000 Å to 15000 Å.

The first conductive contacts 80a and 82a are electrically connected to the light modulator 30. A top surface 901 of the heater 90 is coplanar with a top surface 80a1 of the first conductive contact 80a and a top surface 82a1 of the first conductive contact 82a. The second conductive contacts 80b and 82b are disposed on the first conductive contacts 80a and 82a. The second conductive contacts 80b and 82b include a material of tungsten or other suitable material. The second conductive contact 80b extends perpendicular to the top surface 80a1 of the first conductive contact 80a. The second conductive contact 82b extends perpendicular to the top surface 82a1 of the first conductive contact 82a. The first conductive contact 80a and the second conductive contact 80b define a stepped structure 80s. In some embodiments, a projection area of the second conductive contact 80b is smaller than the area of a top surface 80a1 of the first conductive contact 80a. In some embodiments, a projection area of the first conductive contacts 80a and 82a is respectively smaller than the area of a top surface of the n-plus doped layer 301a or a top surface of the p-plus doped layer 302a. In some embodiments, the stepped structure 80s is located at the interface between the first conductive contact 80a and the second conductive contact 80b. The stepped structure 80s is formed due to the lateral width of the second conductive contact 80b being less than that of the first conductive contact 80a. In some embodiments, the first conductive contact 80a and the second conductive contact 80b includes tungsten identical to that of the heater 90. The perpendicular length of the second conductive contacts 80b and 82b ranges from approximately 2000 Å to 6000 Å.

Conductive interconnects 87, 88, and 89 are formed on the second conductive contacts 80b and 82b and third conductive contacts 83b. The lateral width of the conductive interconnect 88 is less than that of the conductive interconnects 87 and 89. The lateral width of the conductive interconnect 89 is less than that of the conductive interconnect 87. In some embodiments, the conductive interconnects 87, 88, and 89 include material different from that of the heater 90. In some embodiments, the conductive interconnects 87, 88, and 89 include material different from that of the second conductive contacts 80b and 82b. In some embodiments, the conductive interconnects 87, 88, and 89 include material different from that of the third conductive contacts 83b. In some embodiments, the conductive interconnects 87, 88, and 89 include material such as copper (Cu) or other suitable metals. The lateral width of the second conductive contacts 80b and 82b is less than that of the conductive interconnect 87. The perpendicular length of the conductive interconnects 87, 88, and 89 ranges from approximately 0.5 μm to 5.5 μm.

Figure 2A:
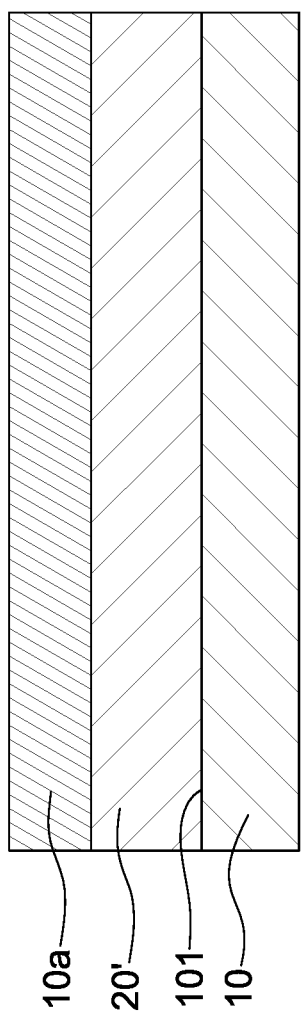

FIGS. 2a, 2b, 2c, 2d, 2e, 2f, 2g, 2h, 2i, 2j, and 2k illustrate a method for manufacturing the semiconductor device 1 shown in FIG. 1, in accordance with some embodiments of the present disclosure. Referring to FIG. 2a, a semiconductor substrate 10 is provided. The semiconductor substrate 10 includes a top surface 101. In some embodiments, the semiconductor substrate 10 includes several materials such as silicon, GaAs, germanium, SOI or other suitable semiconductive materials. A dielectric layer 20' is formed or provided on the top surface 101 of the semiconductor substrate 10. The dielectric layer 20' can be formed in various processes, such as CVD or spin-coating. The dielectric layer 20' includes dielectric materials such as $SiO_2$, SiN, SiCOH, a spin-on low-k dielectric material such as SiLK™, etc, or other suitable materials. In some embodiments, the thickness of the dielectric layer 20' ranges from approximately 1.5 μm to 2 μm. A silicon layer 10a is formed or provided on dielectric layer 20'. In some embodiments, the thickness of the silicon layer 10a ranges from approximately 200 nm to 240 nm.

Figure 2B:
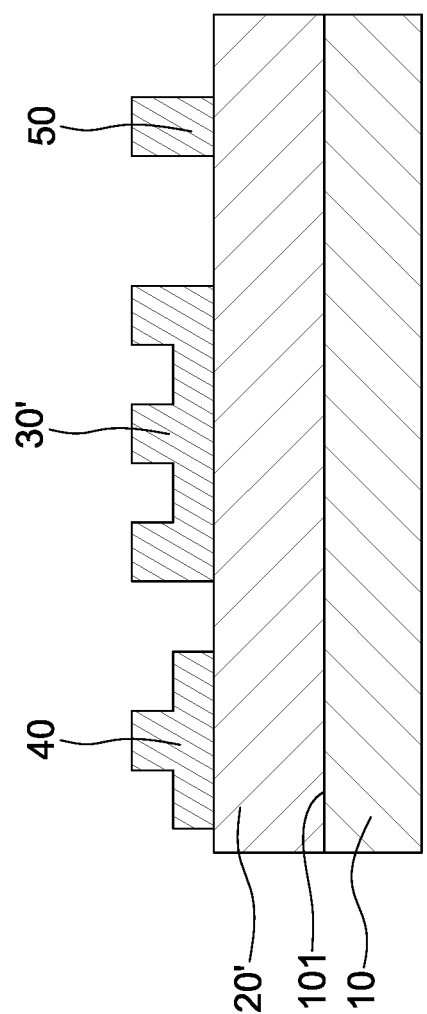

Referring to FIG. 2b, a first waveguide 50, a second waveguide 40, and a silicon structure 30' are formed by shallow Si etching and/or deep Si etching of the silicon layer 10a. In some embodiments, the first waveguide 50 is formed by deep Si etching of the silicon layer 10a. In some embodiments, the second waveguide 40 and the silicon structure 30' are formed by shallow Si etching of the silicon layer 10a.

Figure 2C:
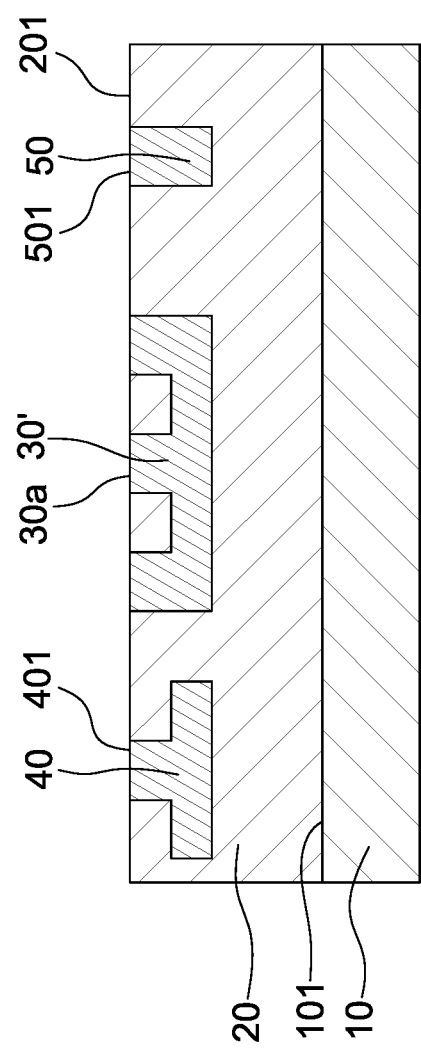

Referring to FIG. 2c, a material the same as the dielectric layer 20' is disposed to cover the first waveguide 50, second waveguide 40, and silicon structure 30', and then a dielectric layer 20 is formed. The top surface 201 of the dielectric layer 20 is coplanar with the top surface 501 of the first waveguide 50, the top surface 30a of the silicon structure 30', and the top surface 401 of the second waveguide 40.

Figure 2D:
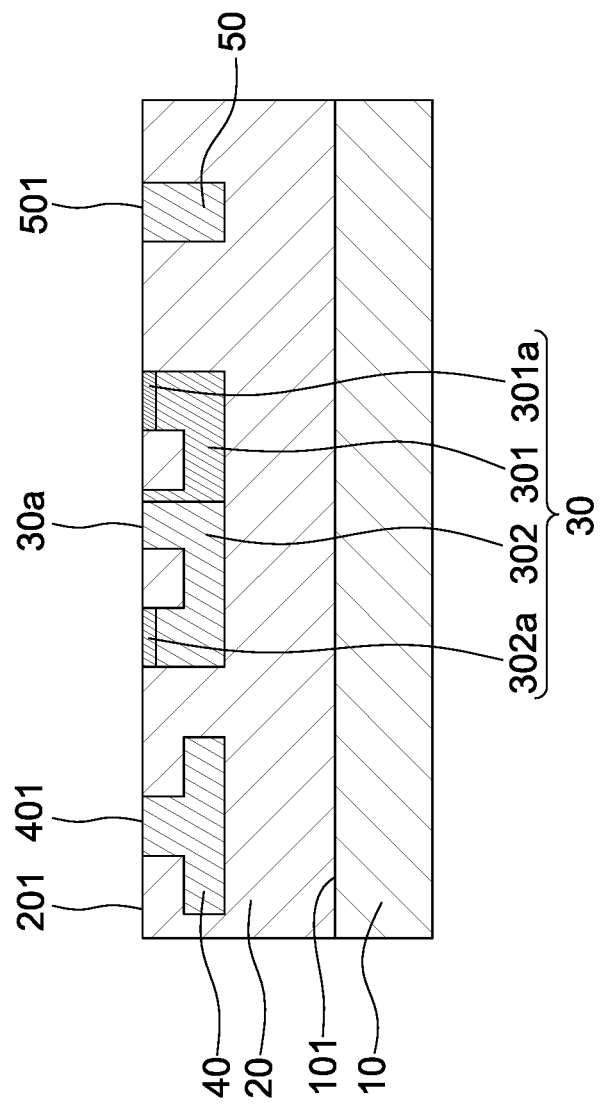

Referring to FIG. 2d, a N type impurity dopant of relatively low concentration is implanted in a n-type doped region 301 and a P type impurity dopant of relatively low concentration is implanted in a p-type doped region 302. In some embodiments, the region 301 may be a n-minus doped region and the region 302 may be a p-minus doped region. A N type impurity dopant of relatively high concentration is implanted in a n-plus doped layer 301a and a P type impurity dopant of relatively high concentration is implanted in a p-plus doped layer 302a. The light modulator 30 is formed after the impurity dopants are implanted. The light modulator 30 includes a n-type doped region 301, a p-type doped region 302, a n-plus doped layer 301a, and a p-plus doped layer 302a.

Figure 2E:
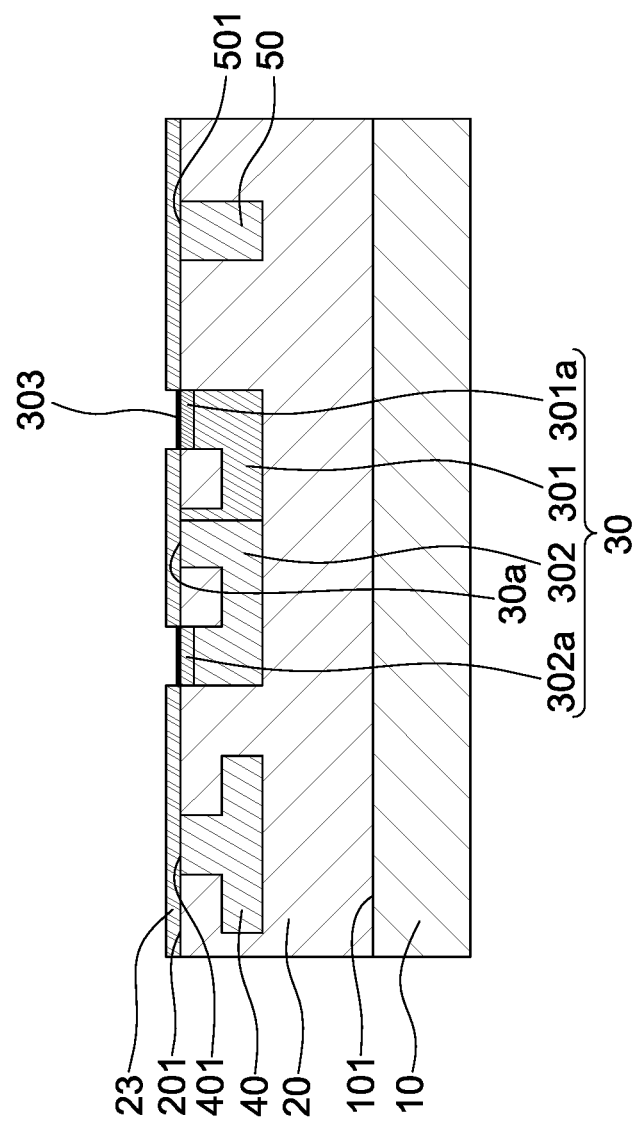

Referring to FIG. 2e, a third dielectric layer 23 is disposed on the first top surface 201 of the first dielectric layer 20. The top surface of the p-plus doped layer 302a and the top surface of the n-plus doped layer 301a are exposed by the third dielectric layer 23. A conductive silicide layer 303 is formed on the top surface of the p-plus doped layer 302a and the top surface of the n-plus doped layer 301a. In some embodiments, the third dielectric layer 23 includes dielectric materials such as $SiO_2$, SiN, SiCOH, a spin-on low-k dielectric material, etc, or other suitable materials. In some embodiments, the third dielectric layer 23 includes $SiO_2$. A top surface of the conductive silicide layer 303 is exposed by the third dielectric layer 23. The level of the top surface of the conductive silicide layer 303 is lower than a top surface of the third dielectric layer 23.

Figure 2F:
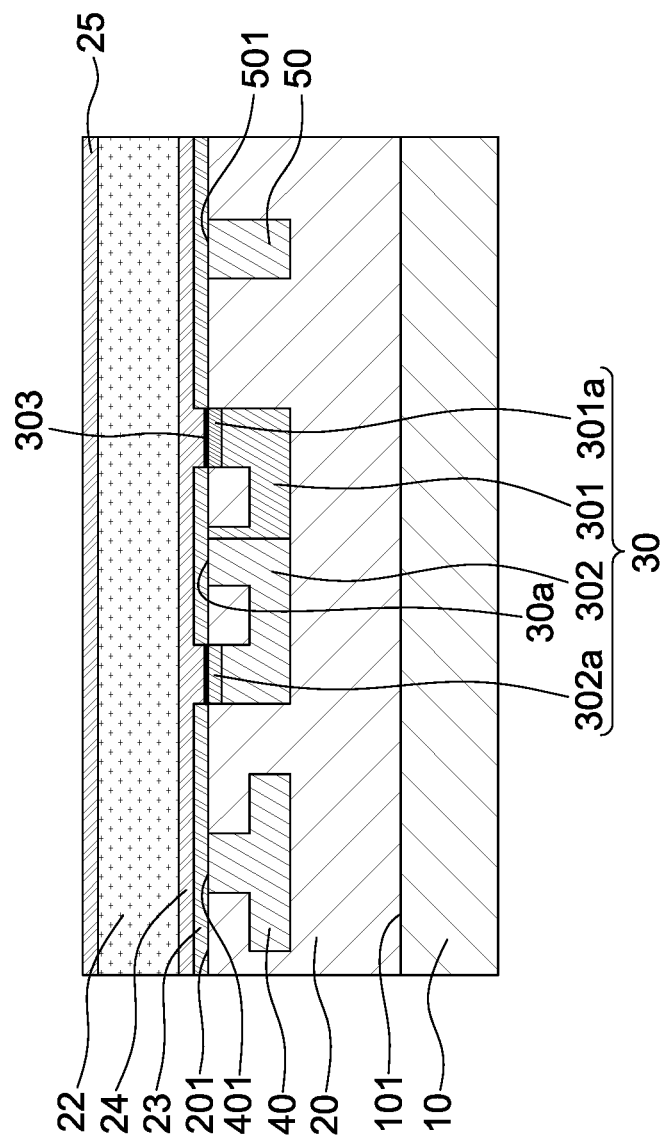

Referring to FIG. 2f, a fourth dielectric layer 24 is formed on the third dielectric layer 23. The fourth dielectric layer 24 covers the third dielectric layer 23 and the conductive silicide layer 303. A portion of the fourth dielectric layer 24 is recessed from the top surface of the third dielectric layer 23 and is surrounded by the third dielectric layer 23. In some embodiments, the fourth dielectric layer 24 includes dielectric materials such as SiN, or other suitable materials. The second dielectric layer 22 is disposed on the fourth dielectric layer 24. The second dielectric layer 22 includes dielectric materials such as $SiO_2$, SiN, SiCOH, a spin-on low-k dielectric material such as SiLK™, etc, or other suitable materials. In some embodiments, the second dielectric layer 22 includes $SiO_2$. A fifth dielectric layer 25 is formed on the second dielectric layer 22. In some embodiments, the fifth dielectric layer 25 includes dielectric materials such as silicon oxynitride (SiON).

Figure 2G:
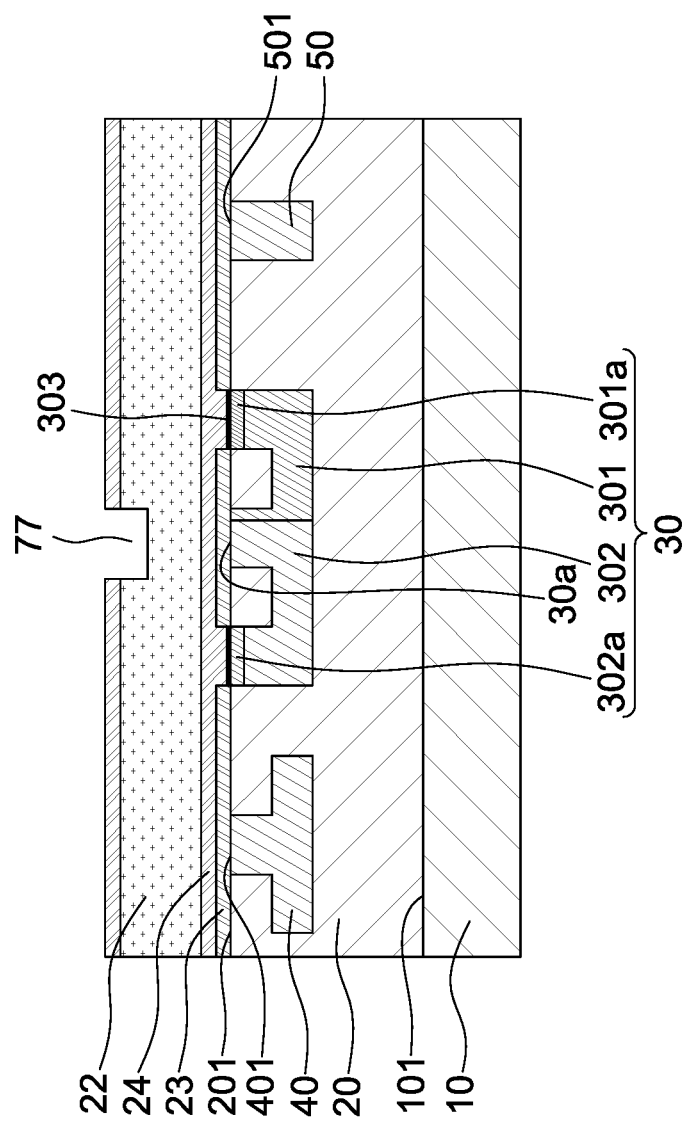

Referring to FIG. 2g, a recess 77 is formed. The recess 77 can be formed, for example, by etching the second dielectric layer 22 and fifth dielectric layer 25. The recess 77 passes through the fifth dielectric layer 25 and a portion of the second dielectric layer 22.

Figure 2H:
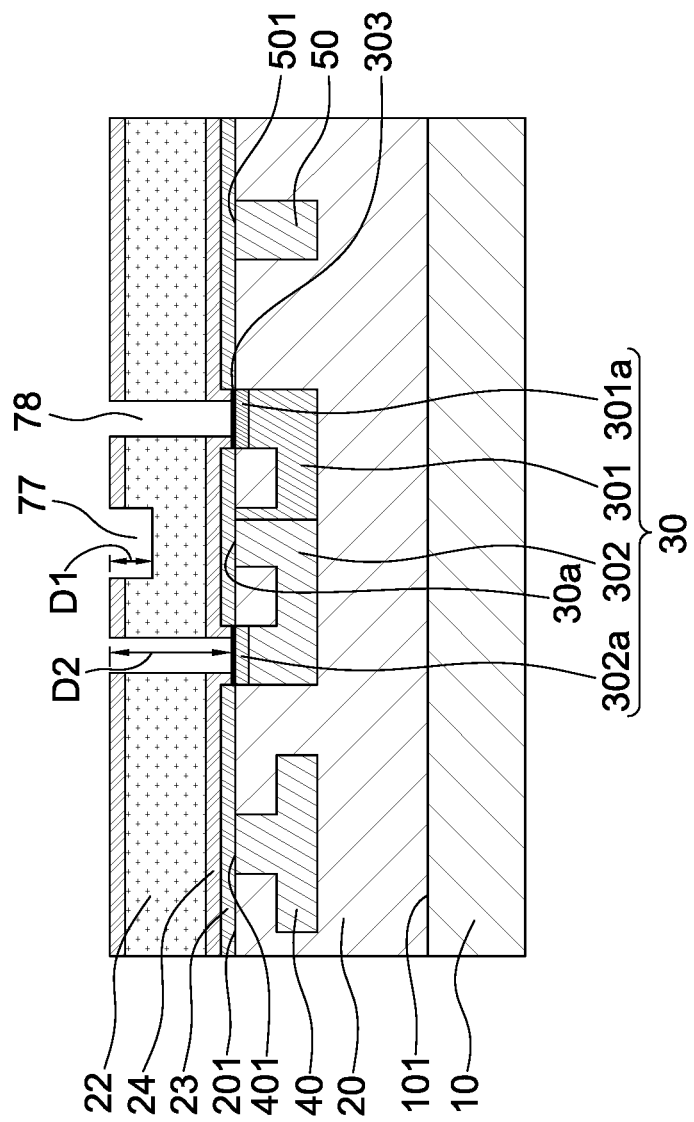

Referring to FIG. 2h, two additional recesses 78 are formed, for example, by etching the second dielectric layer 22, fifth dielectric layer 25, fourth dielectric layer 24, and third dielectric layer 23. After etching, the top surface of the conductive silicide layer 303 is exposed. A first depth D1 of the first recess 77 is different from the second depth D2 of the second recess 78. The second depth D2 is larger than the first depth D1.

Figure 2I:
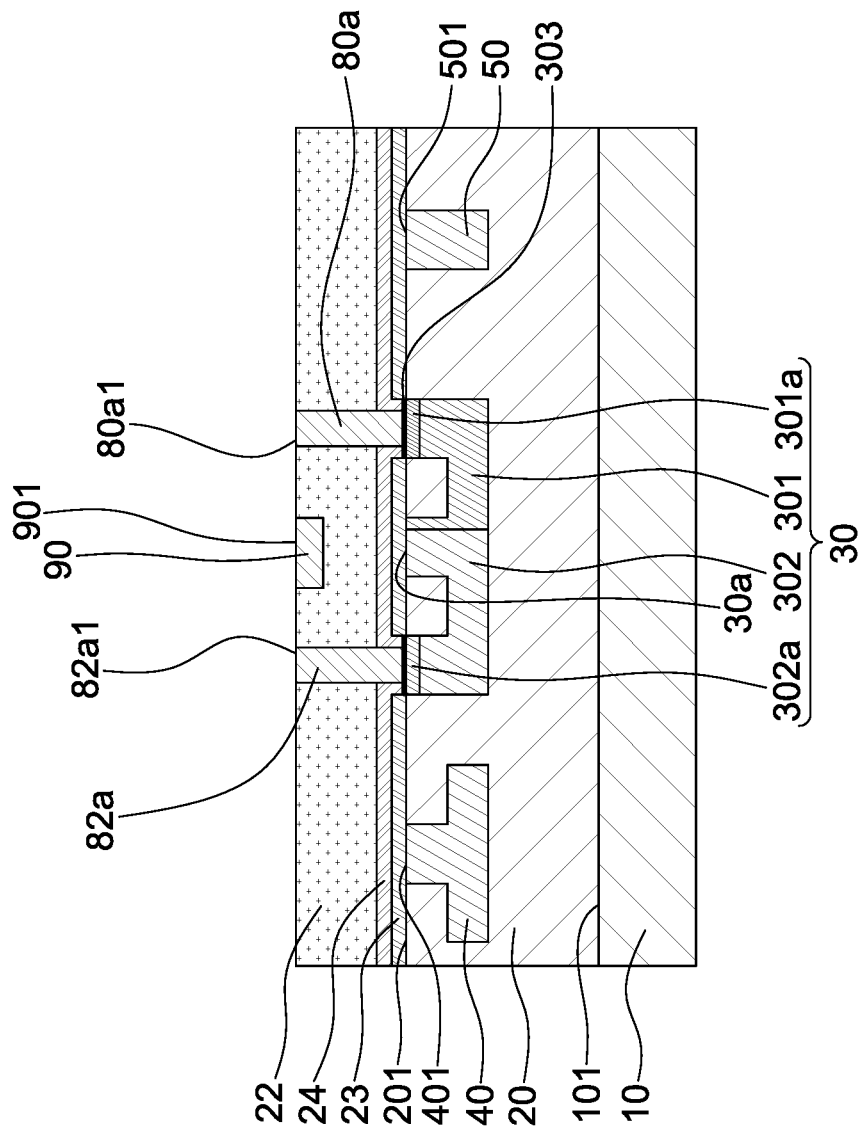

Referring to FIG. 2i, the recess 77 and recesses 78 are filled in the same operation with a conductive material. The conductive material filled within the recess 77 and recesses 78 can include tungsten (W), nichrome, FeCrAl, Cupronickel (CuNi), or any other suitable materials. The filling of recess 77 and recesses 78 can be performed at the same time. After filling, a heater 90 is formed within the recess 77, and first conductive contacts 80a and 82a are formed within the recesses 78. A top surface 80a1 of the first conductive contacts 80a and a top surface 82a1 of the first conductive contacts 82a are coplanar with a top surface 901 of the heater 90. The thickness of the heater 90 ranges from approximately 1500 Å to 3000 Å. A distance between a bottom surface of the heater 90 and a top surface of the fourth dielectric layer 24 ranges from approximately 3000 Å to 12000 Å.

Figure 2J:
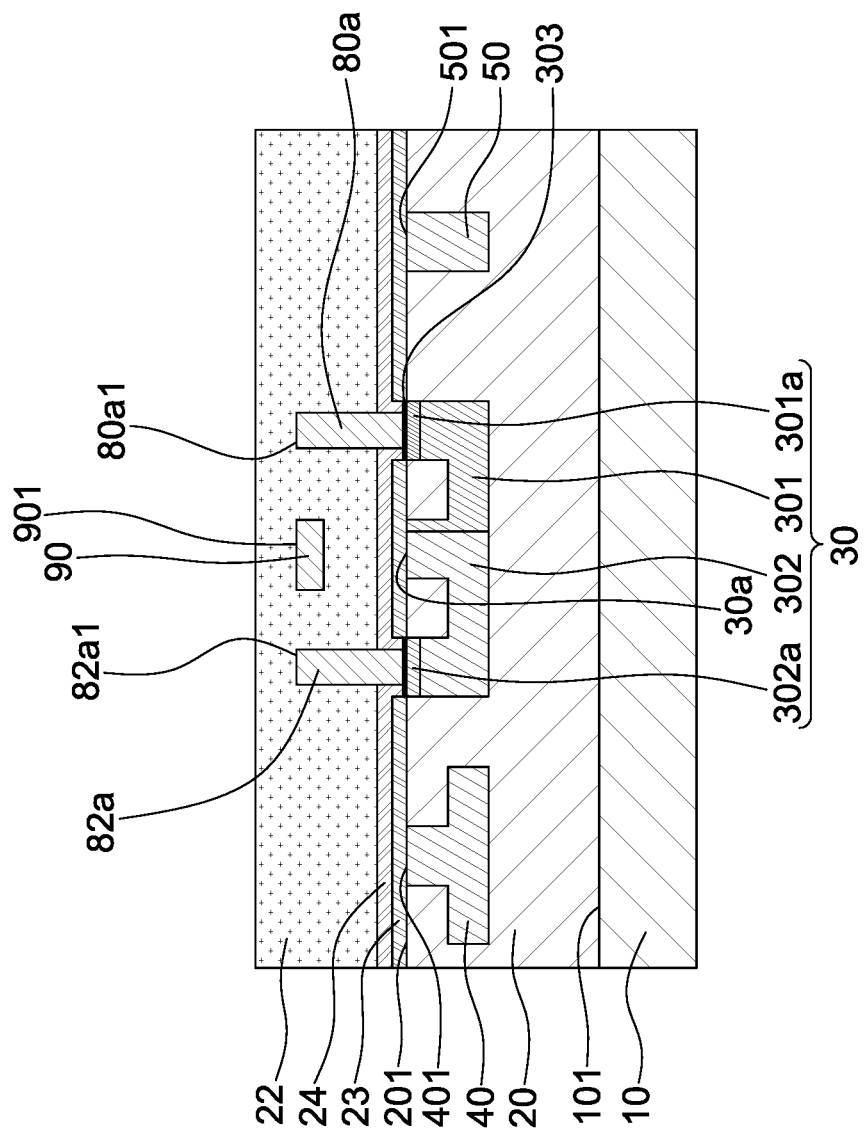

Referring to FIG. 2j, a material the same as the second dielectric layer 22 is formed on the second dielectric layer 20 to cover the first conductive contacts 80a and 82a and the heater 90.

Referring to FIG. 2k, second conductive contacts 80b and 82b are formed on the first conductive contacts 80a and 82a. Third conductive contacts 83b are formed on the heater 90. The third conductive contacts 83b can include material identical to that of the heater 90. The third conductive contacts 83b include tungsten or other suitable material. The third conductive contacts 83b are in contact with the heater 90. The operation for filling the second conductive contacts 80b and 82b uses the same material, such as tungsten. The second conductive contacts 80b and 82b can include material identical to that of the third conductive contacts 83b. The second conductive contacts 80b and 82b, and the third conductive contacts 83b can include material identical to that of the heater 90.

In the condition wherein the material for formation of the first conductive contacts 80a and 82a, the heater 90 and second conductive contacts 80b and 82b uses the same material, forming can be performed by the same machine. That is, it is unnecessary to change machines during formation of a heater and first and second conductive contacts. The formation of the heater 90, first conductive contacts 80a and 82a, and second conductive contacts 80b and 82b can be performed by the same machine. Therefore, in order to form a heater and conductive contacts, contamination (such as forming a heater by using Titanium nitride (TiN)) between machines can be avoided. The etching for TiN was performed before formation of the contacts. Etching is incompatible with the operation for forming tungsten, because a dedicated etching machine is needed for etching TiN and the changing of the dedicated etching machine is thus not economical.

The second conductive contacts 80b and 82b extend perpendicular to the top surface 80a1 of the first conductive contacts 80a and 82a. In some embodiments, the first conductive contact 80a and the second conductive contact 80b define a stepped structure 80s due to a projection area of the second conductive contact 80b being smaller than the area of a top surface 80a1 of the first conductive contact 80a. A side surface of the second conductive contact 80b is not coplanar with a side surface of the first conductive contact 80a. The perpendicular length of the first conductive contacts 80a and 82a ranges from approximately 3000 Å to 15000 Å. The perpendicular length of the second conductive contacts 80b and 82b ranges from approximately 2000 Å to 6000 Å.

Material the same as the second dielectric layer 22 is formed on the second dielectric layer 22 to cover the second conductive contacts 80b and 82b and third conductive contacts 83b. Next, conductive interconnects 87, 88, and 89 are formed in the second dielectric layer 22 by multiple etching and filling operations. The conductive interconnects 87, 88, and 89 include several materials such as Cu or other suitable materials. After the conductive interconnects 87, 88, and 89 are formed, the semiconductor device 1 shown in FIG. 1 is obtained.

Figure 3:
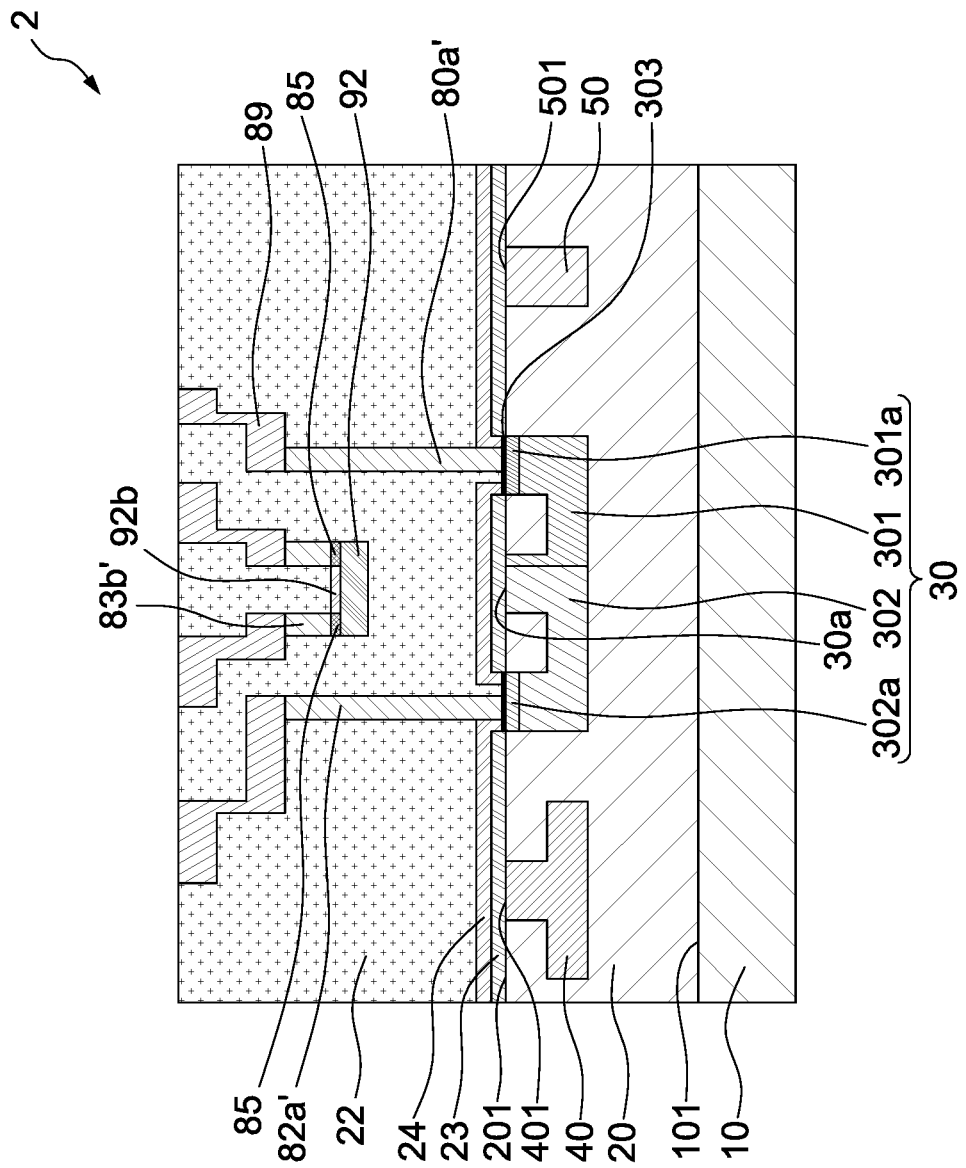
FIG. 3 is a diagram of a semiconductor device in accordance with some embodiments of the present disclosure.

FIG. 3 is diagram of a semiconductor device 2 in accordance with some embodiments of the present disclosure. FIG. 3 shows a semiconductor device 2. The semiconductor device 2 is similar to the semiconductor device 1 shown in FIG. 1 except the heater 92 and the conductive contacts 80a', 82a', and 83a'. The semiconductor device 2 includes a semiconductor substrate 10, a first dielectric layer 20, a second dielectric layer 22, a light modulator 30, a first waveguide 50, a second waveguide 40, a heater 92, first conductive contacts 80a' and 82a', and third conductive contacts 83a'.

In some embodiments, the semiconductor substrate 10 includes several materials such as silicon, GaAs, germanium, SOI or other suitable semiconductive materials. The first dielectric layer 20 is disposed on the semiconductor substrate 10. The first dielectric layer 20 includes dielectric materials such as $SiO_2$, SiN, SiCOH, a spin-on low-k dielectric material such as SiLK™, etc, or other suitable materials. The light modulator 30 is disposed in the first dielectric layer 20. The thickness of the light modulator 30 ranges from approximately 200 nm to 240 nm. The thickness of the first waveguide 50 and second waveguide 40 ranges from approximately 200 nm to 240 nm. The light modulator 30 is configured to modulate a frequency of light passing through the first waveguide 50 and the second waveguide 40.

The light modulator 30 includes a n-type doped region 301, a p-type doped region 302, a n-plus doped layer 301a disposed on the n-type doped region 301, and a p-plus doped layer 302a disposed on the p-type doped region 302. A conductive silicide layer 303 is disposed on the p-plus doped layer 302a and the n-plus doped layer 301a. In some embodiments, the conductive silicide layer 303 includes Co silicide or Ni silicide, or other suitable materials. The first conductive contact 80a' is electrically connected to the conductive silicide layer 303 and the conductive silicide layer 303 is electrically connected to the n-plus doped layer 301a. The first conductive contact 82a' is electrically connected to the conductive silicide layer 303 and the conductive silicide layer 303 is electrically connected to the p-plus doped layer 302a.

The third conductive contacts 80a' and 82a' include tungsten. In some embodiments, the third conductive contacts 83b' include tungsten. The heater 92 includes a material different from that of the third conductive contacts 80a' and 82a'. In some embodiments, the heater 92 includes Titanium nitride (TiN). In some embodiments, a seed layer 85 is formed on the heater 92. The seed layer 85 is electrically connected to the heater 92. In some embodiments, the seed layer 85 includes Titanium (Ti). The third conductive contacts 83b' is electrically connected to the seed layer 85. A distance between a bottom surface of the heater 92 and a top surface of the fourth dielectric layer 24 ranges from approximately 5000 Å to 10000 Å. A length of the conductive contacts 80a' and 82a' ranges from approximately 6000 Å to 12000 Å. The thickness of the heater 92 ranges from approximately 1500 Å to 3000 Å.

Conductive interconnects 89 are formed on the third conductive contacts 83b' and first conductive contact 80a' and 82a'. In some embodiments, the conductive interconnects 89 include a material such as Cu or other suitable metals. A dielectric layer 92b is formed on the heater 92. In some embodiments, the dielectric layer 92b includes dielectric materials such as SiN, or other suitable materials.

Figure 4A:
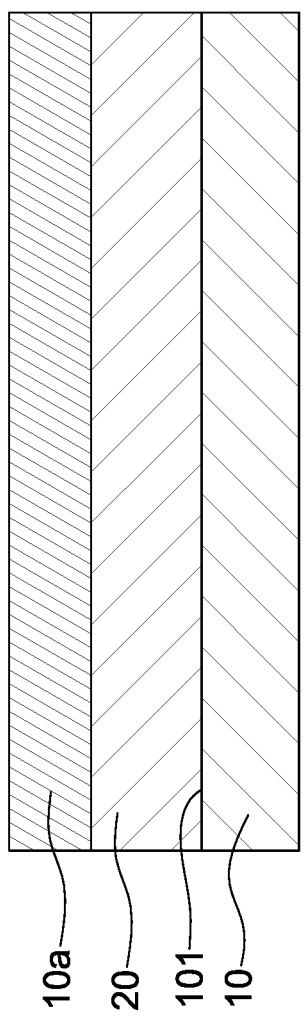
FIGS. 4a, 4b, 4c, 4d, 4e, 4f, 4g, 4h, 4i, and 4j illustrate a method for manufacturing a semiconductor device in accordance with some embodiments of the present disclosure.

FIGS. 4a, 4b, 4c, 4d, 4e, 4f, 4g, 4h, 4i, and 4j illustrate a method for manufacturing the semiconductor device 2 shown in FIG. 3, in accordance with some embodiments of the present disclosure. Referring to FIG. 4a, a semiconductor substrate 10 is provided. In some embodiments, the semiconductor substrate 10 includes several materials such as silicon, GaAs, germanium, SOI or other suitable semiconductive materials. A first dielectric layer 20 is formed or provided on the top surface 101 of the semiconductor substrate 10. The first dielectric layer 20 includes dielectric materials such as $SiO_2$, SiN, SiCOH, a spin-on low-k dielectric material such as SiLK™, etc, or other suitable materials. In some embodiments, the thickness of the first dielectric layer 20 ranges from approximately 1.5 μm to 2 μm. A silicon layer 10a is formed or provided on first dielectric layer 20. In some embodiments, the thickness of the silicon layer 10a ranges from approximately 200 nm to 240 nm.

Figure 4B:
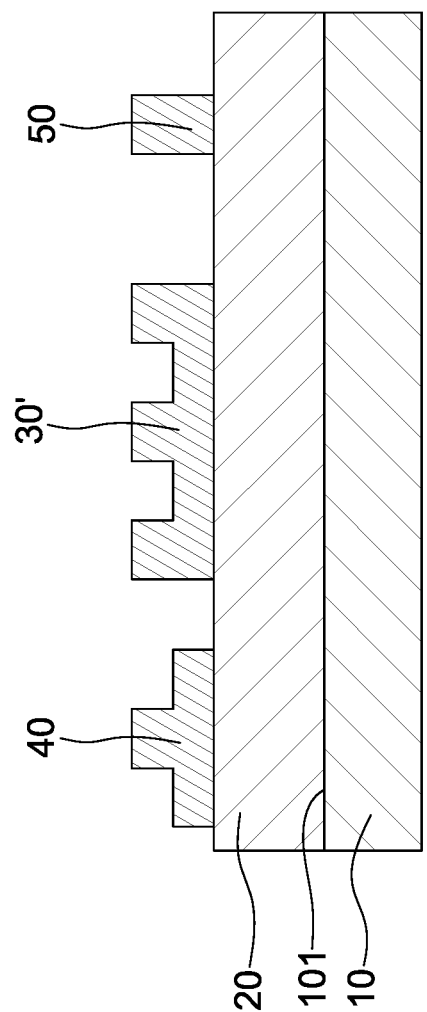

Referring to FIG. 4b, a first waveguide 50, a second waveguide 40, and a silicon structure 30' are formed by shallow Si etching and/or deep Si etching of the silicon layer 10a. In some embodiments, the first waveguide 50, the second waveguide 40, and the silicon structure 30' are formed by operations similar to those recited for FIG. 2b.

Figure 4C:
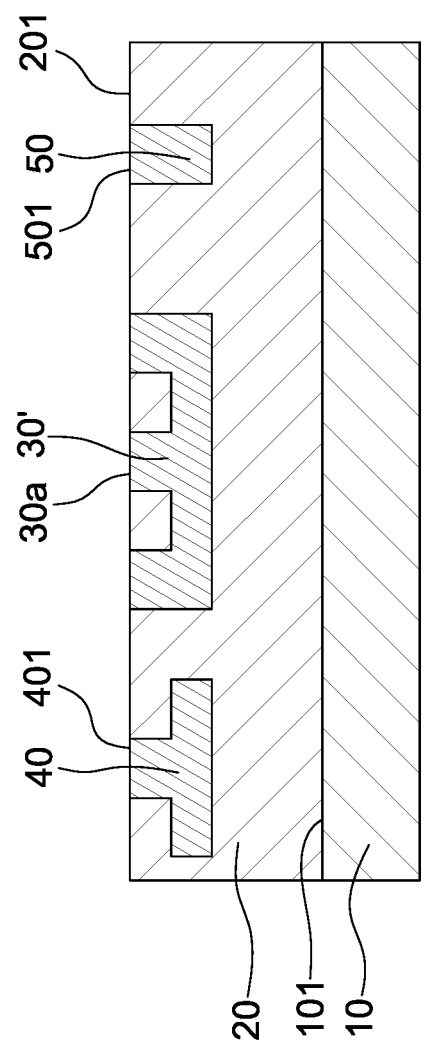

Referring to FIG. 4c, a material the same as the first dielectric layer 20 is formed on the first dielectric layer 20 to cover the first waveguide 50, second waveguide 40, and silicon structure 30'. The first top surface 201 of the first dielectric layer 20 is coplanar with a second top surface 501 of the first waveguide 50, a third top surface 30a of the silicon structure 30', and a fourth top surface 401 of the second waveguide 40 the first top surface 201.

Figure 4D:
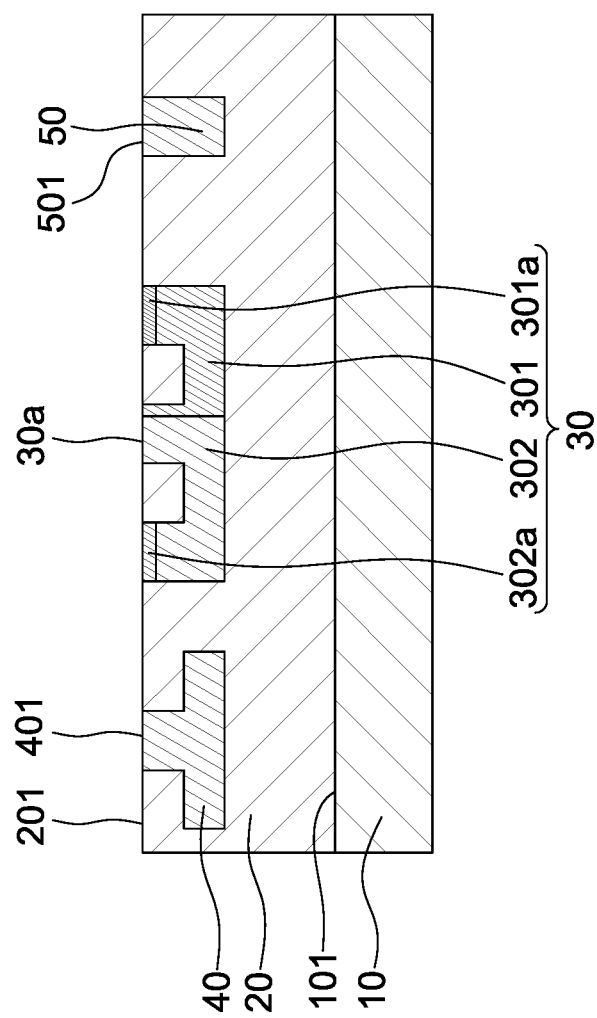

Referring to FIG. 4d, the operations of implanting of the impurity dopants are similar to those recited for FIG. 2d. After implanting, the light modulator 30 is formed. The light modulator 30 includes a n-type doped region 301, a p-type doped region 302, a n-plus doped layer 301a, and a p-plus doped layer 302a.

Figure 4E:
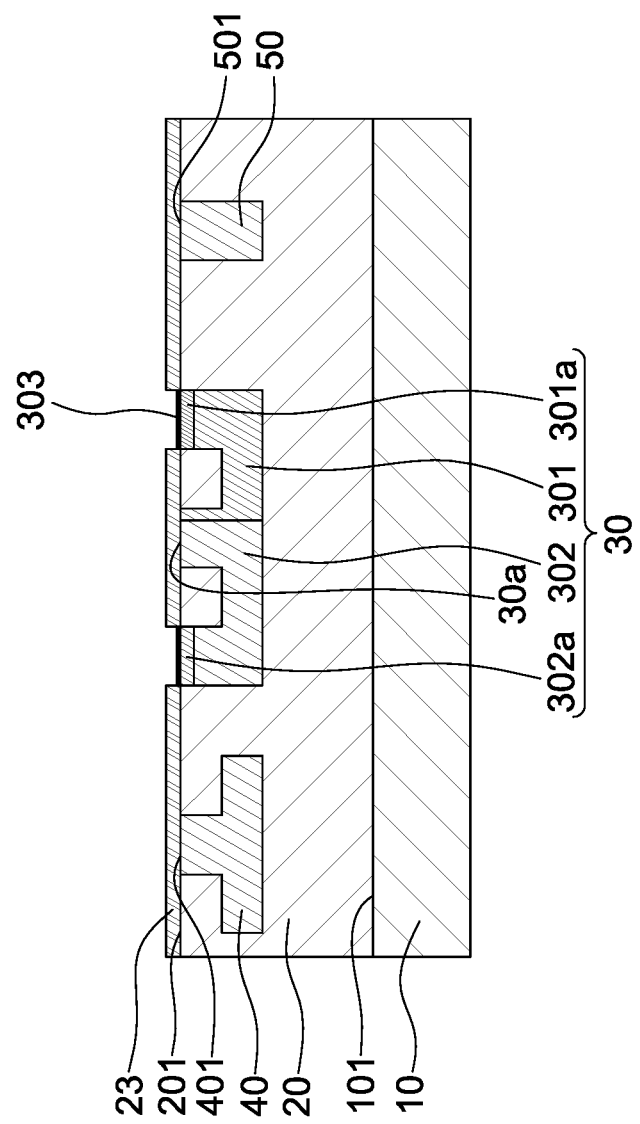

Referring to FIG. 4e, a third dielectric layer 23 is disposed on the first top surface 201 of the first dielectric layer 20. Formation of the third dielectric layer 23 is similar to that recited for FIG. 4e.

Figure 4F:
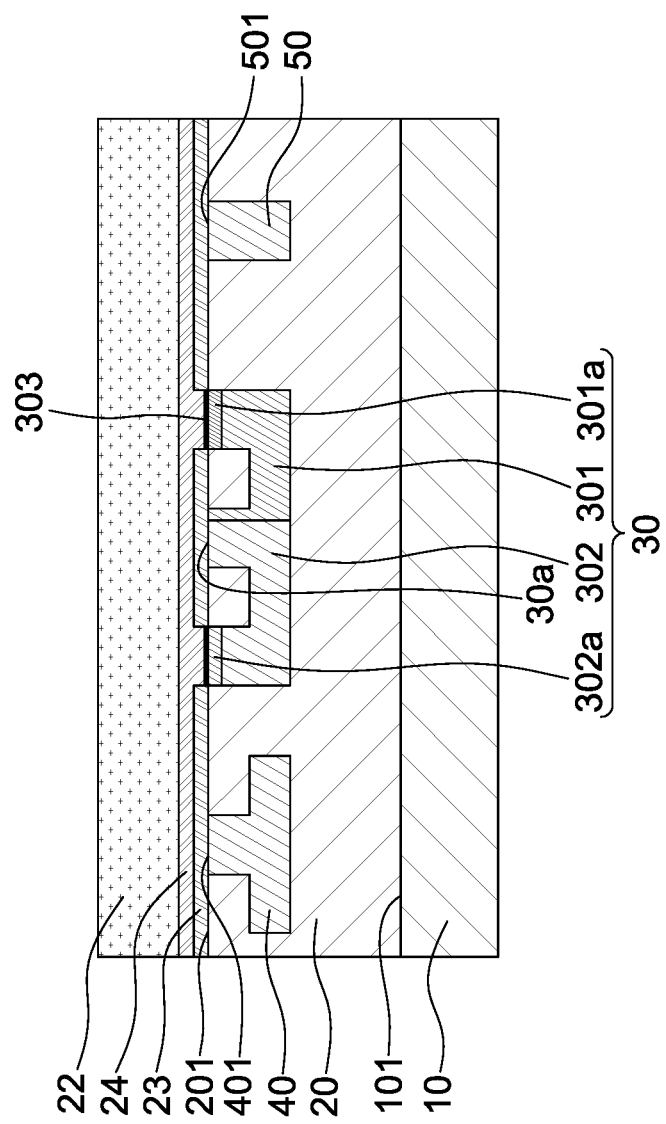

Referring to FIG. 4f, a fourth dielectric layer 24 is formed on the third dielectric layer 23. A portion of the fourth dielectric layer 24 is recessed from the top surface of the third dielectric layer 23 and is disposed in the third dielectric layer 23. In some embodiments, the fourth dielectric layer 24 includes dielectric materials such as SiN, or other suitable materials. The second dielectric layer 22 is disposed on the fourth dielectric layer 24. The second dielectric layer 22 includes dielectric materials such as $SiO_2$, SiN, SiCOH, a spin-on low-k dielectric material such as SiLK™, etc, or other suitable materials. In some embodiments, the second dielectric layer 22 includes $SiO_2$.

Figure 4G:
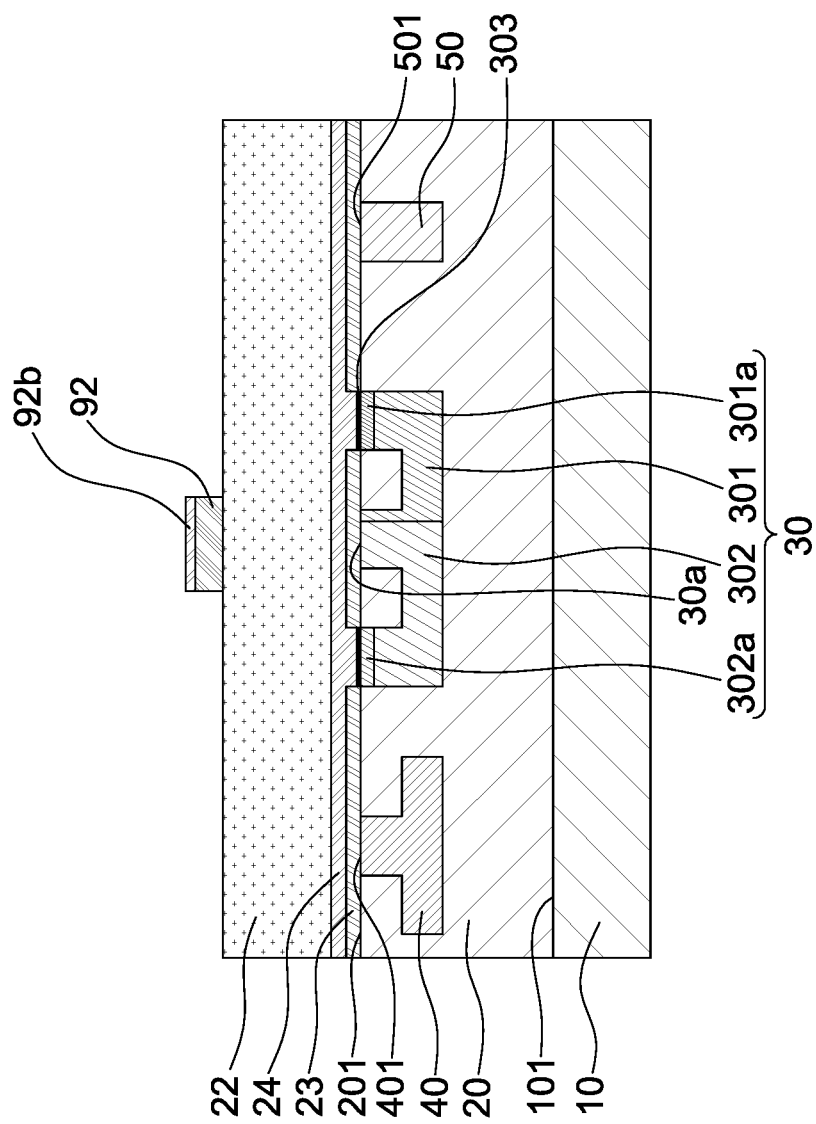

Referring to FIG. 4g, a heater 92 is formed on the second dielectric layer 22. In some embodiments, the heater 92 includes TiN. A dielectric layer 92b is formed on the heater 92. In some embodiments, the dielectric layer 92b includes dielectric materials such as SiN, SiON, or other suitable materials. The dielectric layer 92b can be an anti-reflection coating (ARC) layer utilized in the formation of the heater 92 during photolithography.

Figure 4H:
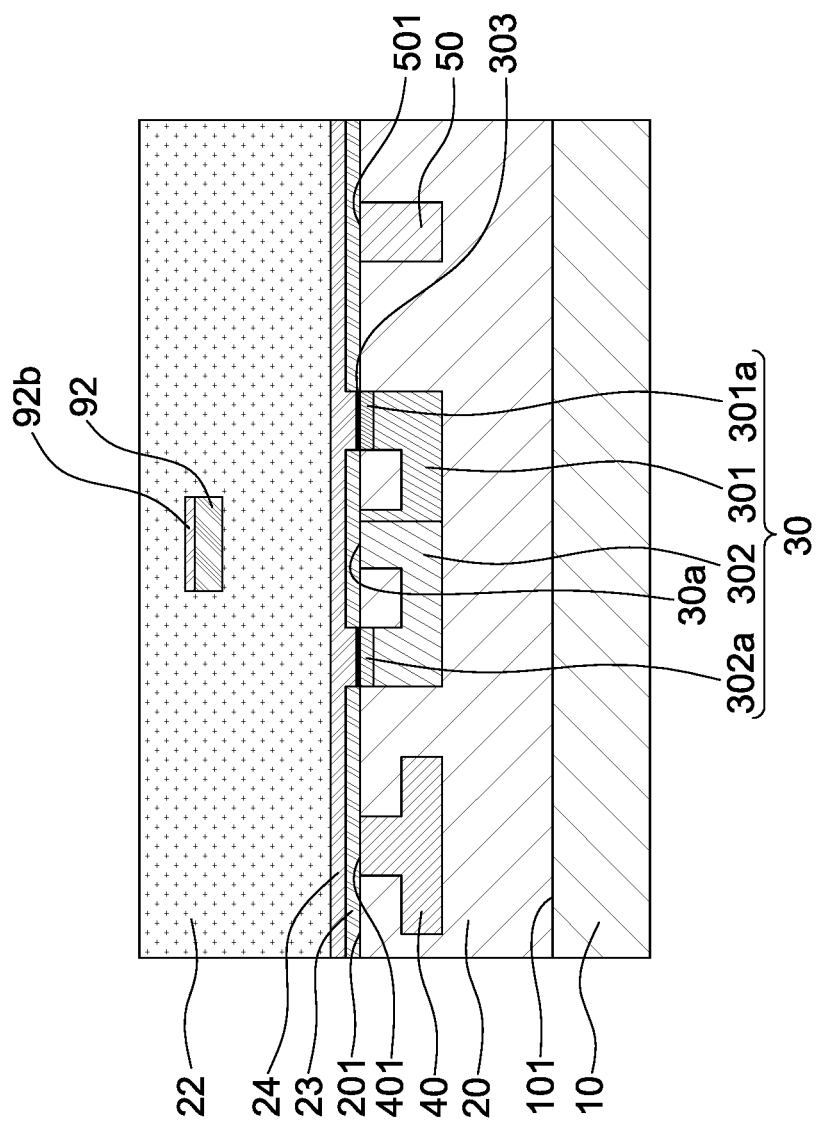

Referring to FIG. 4h, a material the same as the second dielectric layer 22 is formed to cover the heater 92 and dielectric layer 92b.

Figure 4I:
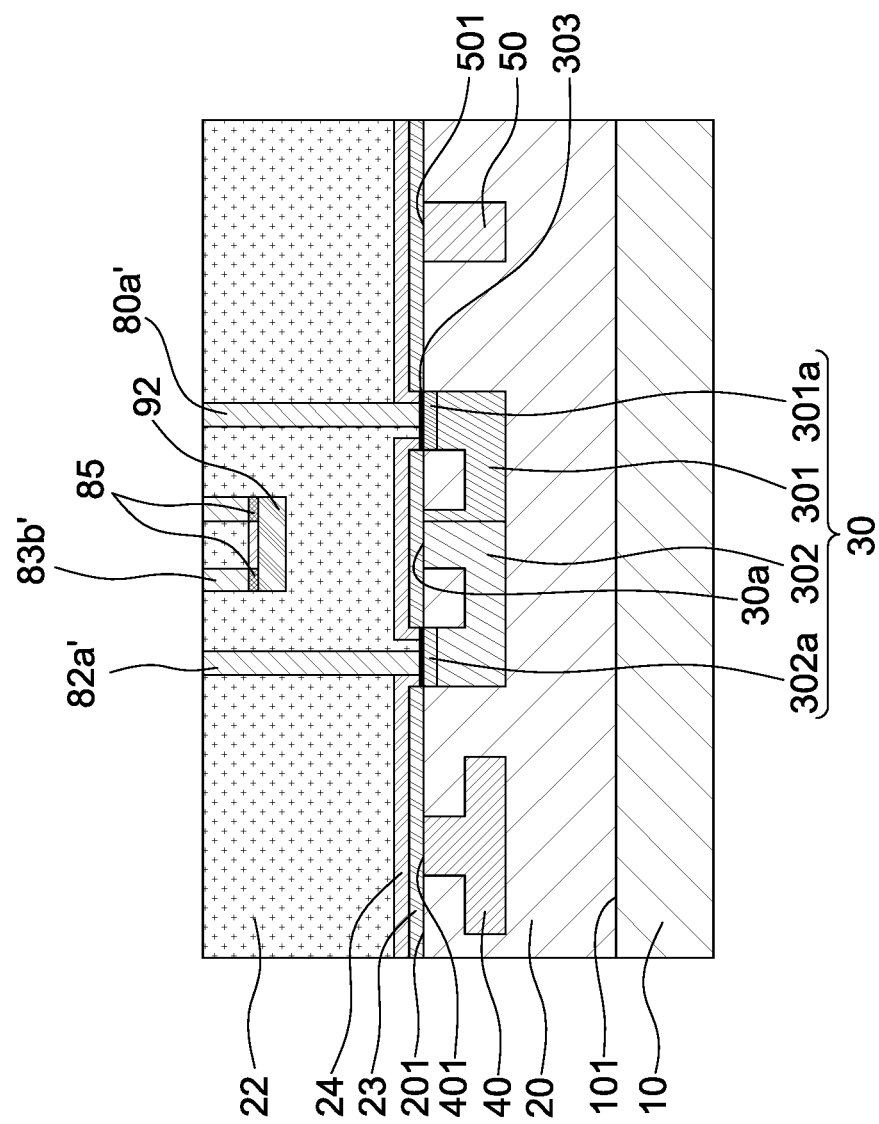

Referring to FIG. 4i, two recesses above the heater 92 are formed in the second dielectric layer 22, and filled with a seed layer 85. The seed layer 85 is electrically connected to the heater 92. In some embodiments, the seed layer 85 includes Ti. Two recesses above the conductive silicide layer 303 are formed. Next, a metal material (such as W) is filled into the four recesses. After filling, the conductive contacts 80a', 82a', and 83a' are obtained. A distance between a bottom surface of the heater 92 and a top surface of the fourth dielectric layer 24 ranges from approximately 5000 Å to 10000 Å. A length of the conductive contacts 80a' and 82a' ranges from approximately 6000 Å to 12000 Å. The thickness of the heater 92 ranges from approximately 1500 Å to 3000 Å.

Figure 4J:
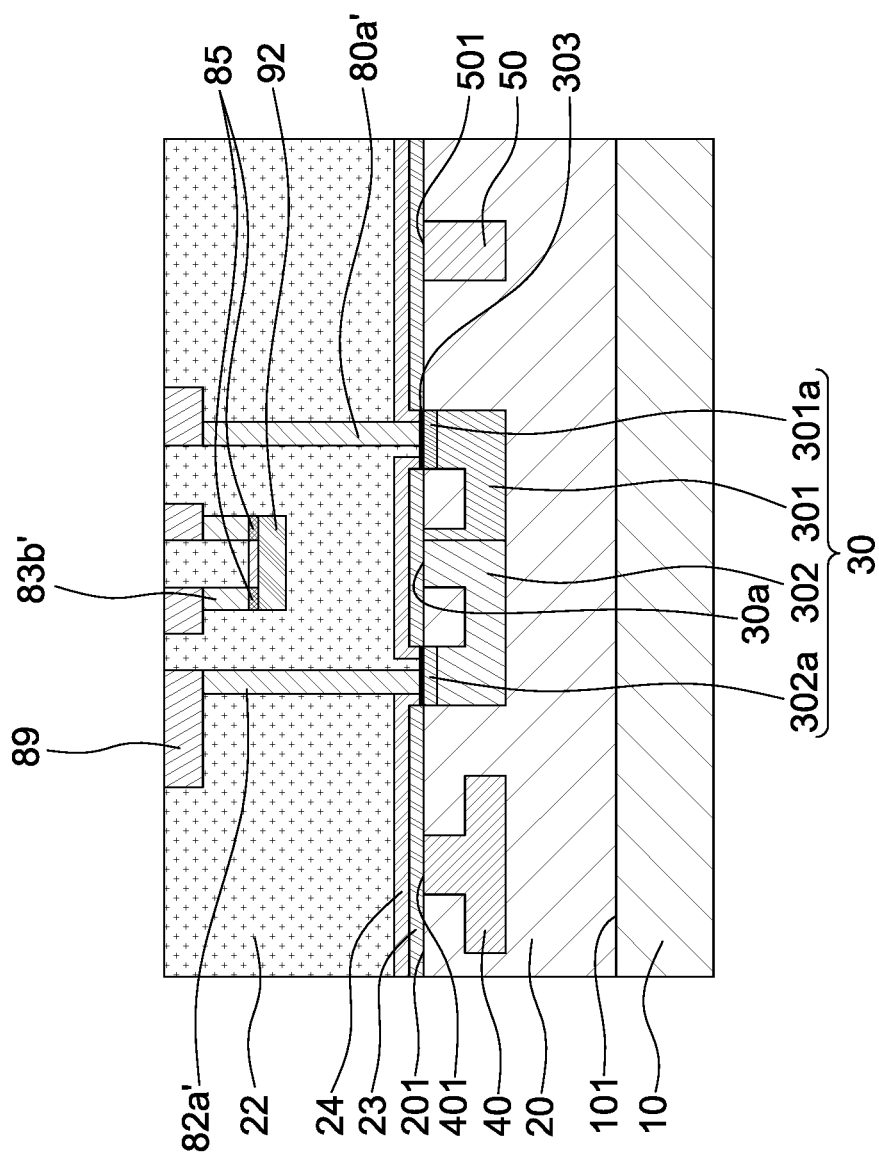

Referring to FIG. 4j, material the same as the second dielectric layer 22 is formed to cover a top surface of the conductive contacts 80a', 82a', and 83b'. Conductive interconnects 89 are formed on the conductive contacts 80a' and 82a' and third conductive contacts 83b'. After the conductive interconnects 89 are formed, the semiconductor device 2 shown in FIG. 3 is obtained.

Figure 5:
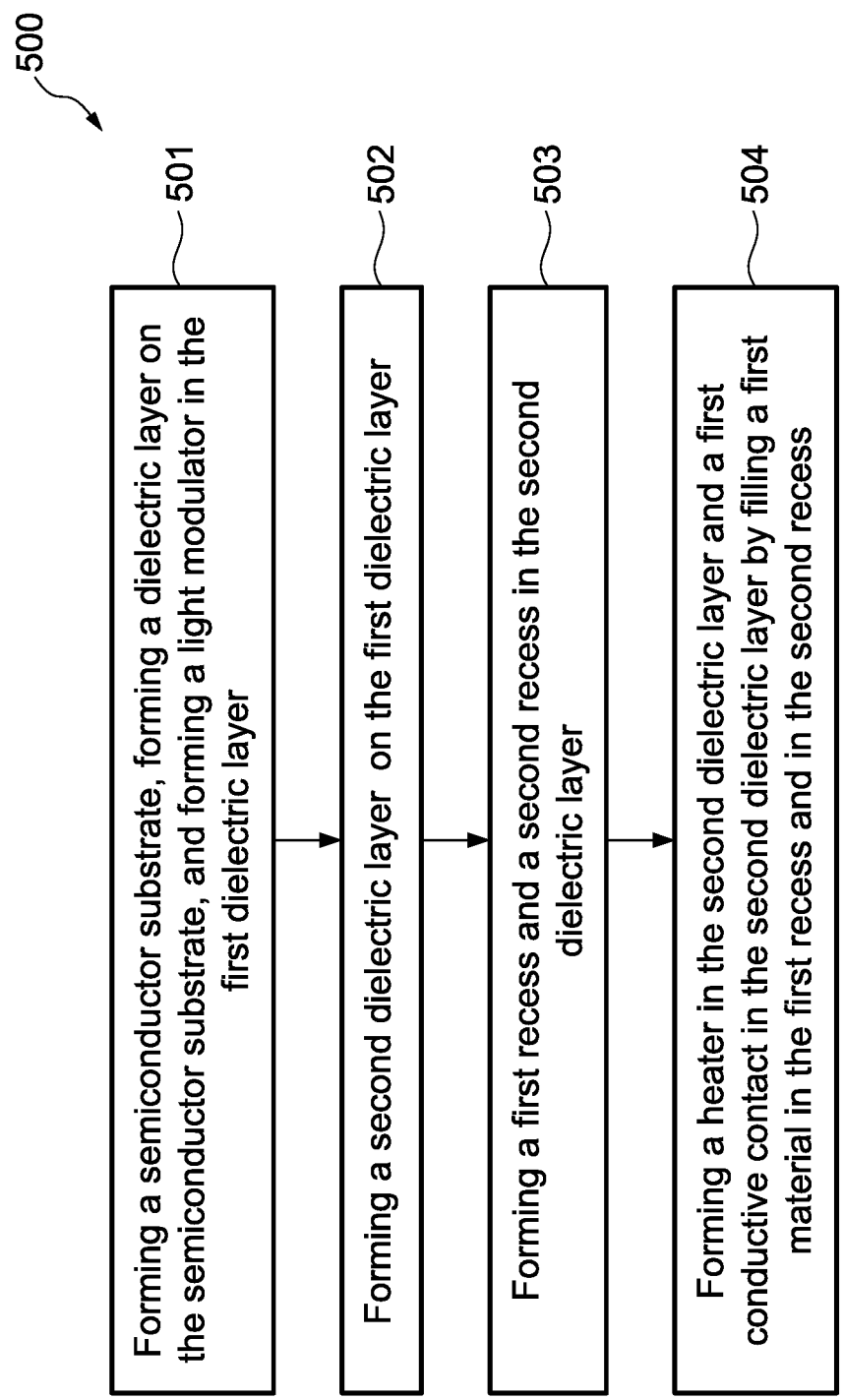
FIG. 5 is a flow chart of an embodiment of a method of manufacturing a semiconductor device in accordance with some embodiments of the present disclosure.

FIG. 5 is a flow chart of an embodiment of a method 500 of manufacturing a semiconductor device 1 in accordance with some embodiments of the present disclosure. The method 500 includes forming a semiconductor substrate 10, forming a dielectric layer 20' on the semiconductor substrate 10, and forming a light modulator 30 in the first dielectric layer 20 (block 501). The method 500 includes forming a second dielectric layer 22 on the first dielectric layer 20 (block 502). The method 500 includes forming a first recess 77 and a second recess 78 in the second dielectric layer 22 (block 503). The method 500 includes forming a heater 90 in the second dielectric layer 22 and a first conductive contact 80a and 82a in the second dielectric layer 22 by filling a first material in the first recess 77 and in the second recess 78 (block 504).

According to some embodiments, a method for arranging electrical components within a semiconductor device is provided. The method includes (a) placing a plurality of cells in a first layout; (b) generating a second layout by performing a first set of calculations on the first layout such that a total wire length of the second layout is less than that of the first layout; (c) generating a third layout by performing a second set of calculations on the second layout such that cell congestions in the second layout is eliminated from the third layout; (d) generating a fourth layout by performing a third set of calculations on the third layout such that the total wire length of the fourth layout is less than that of the third layout; and (e) iterating the operations (c) and (d) until a target layout conforming a convergence criterion.

According to other embodiments, a non-transitory computer-readable medium is provided. The non-transitory computer-readable medium stores computer-executable instructions executed on a computer system for arranging electrical components within a semiconductor device. The computer-executable instructions (a) placing a plurality of cells in a first layout; (b) generating a second layout by performing a first set of calculations on the first layout such that a total wire length of the second layout is less than that of the first layout; (c) generating a third layout by performing a second set of calculations on the second layout such that cell congestions in the second layout is eliminated from the third layout; (d) generating a fourth layout by performing a third set of calculations on the third layout such that the total wire length of the fourth layout is less than that of the third layout; and (e) iterating the operations (c) and (d) until a target layout conforming a convergence criterion. Wherein the operation (c) further includes determining a first window according to a congestion status; rearranging the cells in the first window evenly.

According to other embodiments, an apparatus for arranging electrical components within a semiconductor device. The apparatus includes at least one non-transitory computer-readable medium having stored thereon computer-executable instructions; and at least one processor coupled to the at least one non-transitory computer-readable medium. Wherein the computer-executable instructions are executable by the at least one processor and cause the apparatus to (a) place a plurality of cells in a first layout; (b) generate a second layout by performing a first set of calculations on the first layout such that a total wire length of the second layout is less than that of the first layout; (c) generate a third layout by performing a second set of calculations on the second layout such that cell congestions in the second layout is eliminated from the third layout; (d) generate a fourth layout by performing a third set of calculations on the third layout such that the total wire length of the fourth layout is less than that of the third layout; and (e) iterate the operations (c) and (d) until a target layout conforming a convergence criterion.

According to some embodiments, a semiconductor device includes a semiconductor substrate, a first dielectric layer, a second dielectric layer, a light modulator, a heater, and a first conductive contact. The first dielectric layer is disposed on the semiconductor substrate. The second dielectric layer is disposed on the first dielectric layer. The light modulator is disposed in the first dielectric layer. The heater is disposed in the second dielectric layer and above the light modulator. The first conductive contact is electrically connected to the light modulator. A top surface of the heater is coplanar with a top surface of the first conductive contact.

According to some embodiments, a semiconductor device includes a semiconductor substrate, a first dielectric layer, a second dielectric layer, a light modulator, a heater, a first conductive contact, and a second conductive contact. The first dielectric layer is disposed on the semiconductor substrate. The second dielectric layer is disposed on the first dielectric layer. The light modulator is disposed in the first dielectric layer. The heater is disposed in the second dielectric layer and above the light modulator. The first conductive contact is electrically connected to the light modulator. The second conductive contact is disposed on the first conductive contact. A projection area of the second conductive contact is smaller than the area of a top surface of the first conductive contact.

According to some embodiments, a method for manufacturing a semiconductor device comprises: forming a semiconductor substrate; forming a first dielectric layer on the semiconductor substrate; forming a light modulator in the first dielectric layer; forming a second dielectric layer on the first dielectric layer; forming a first recess and a second recess in the second dielectric layer; forming a heater in the second dielectric layer and a first conductive contact in the second dielectric layer by filling a first material in the first recess and in the second recess.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A semiconductor device comprising:
   a semiconductor substrate;
   a first dielectric layer disposed on the semiconductor substrate;
   a second dielectric layer disposed on the first dielectric layer;
   a light modulator disposed in the first dielectric layer;
   a heater disposed in the second dielectric layer and above the light modulator;
   a first conductive contact electrically connected to the light modulator; and
   a first waveguide embedded within the first dielectric layer, wherein a first top surface of the first dielectric layer is coplanar with a second top surface of the first waveguide and a third top surface of the light modulator, wherein
   a top surface of the heater is coplanar with a top surface of the first conductive contact.

2. The semiconductor device of claim 1, wherein the first conductive contact includes a material identical to that of the heater.

3. The semiconductor device of claim 1, further comprising a second conductive contact disposed on the first conductive contact, wherein the second conductive contact extends perpendicular to the top surface of the first conductive contact.

4. The semiconductor device of claim 1, further comprising a second conductive contact disposed on the first conductive contact, wherein the first conductive contact and the second conductive contact define a stepped structure.

5. The semiconductor device of claim 1, further comprising:
a second waveguide embedded within the first dielectric layer and including a fourth top surface, wherein
the fourth top surface is coplanar with the first top surface, and
the heater is configured to control the photons transmitted in the light modulator.

6. The semiconductor device of claim 5, wherein the first waveguide is a strip waveguide and the second waveguide is a rib waveguide.

7. The semiconductor device of claim 5, wherein the light modulator is configured to modulate a frequency of light passing through the first waveguide or the second waveguide.

8. The semiconductor device of claim 1, wherein the heater is configured to adjust a frequency of light passing through the light modulator.

9. The semiconductor device of claim 1, wherein the light modulator further comprises a n-type doped region, a p-type doped region, a n-plus doped layer disposed on the n-type doped region, and a p-plus doped layer disposed on the p-type doped region.

10. The semiconductor device of claim 9, further comprising a conductive silicide layer disposed on the p-plus doped layer and the n-plus doped layer.

11. The semiconductor device of claim 10, wherein the first conductive contact is disposed on the conductive silicide layer.

12. The semiconductor device of claim 10, further comprising a third dielectric layer disposed between the first dielectric layer and the second dielectric layer, wherein an elevation level of a top surface of the conductive silicide layer is lower than an elevation level of a top surface of the third dielectric layer.

13. The semiconductor device of claim 12, further comprising a fourth dielectric layer disposed on the third dielectric layer and surrounding a portion of a side surface of the first conductive contact.

14. The semiconductor device of claim 9, wherein a projection area of the first conductive contact is smaller than the area of a top surface of the n-plus doped layer or the p-plus doped layer.

15. The semiconductor device of claim 1, wherein the heater includes a material of tungsten (W).

16. A semiconductor device comprising:
a semiconductor substrate;
a first dielectric layer disposed on the semiconductor substrate;
a second dielectric layer disposed on the first dielectric layer;
a light modulator disposed in the first dielectric layer;
a heater disposed in the second dielectric layer and above the light modulator; and
a first conductive contact electrically connected to the light modulator;
a first waveguide embedded within the first dielectric layer, wherein a first top surface of the first dielectric layer is coplanar with a second top surface of the first waveguide and a third top surface of the light modulator; and
a second conductive contact disposed on the first conductive contact, wherein a projection area of the second conductive contact is smaller than the area of a top surface of the first conductive contact.

17. The semiconductor device of claim 16, wherein the first conductive contact includes a material identical to that of the heater.

18. The semiconductor device of claim 16, wherein the heater includes a material of tungsten (W).

19. A method for manufacturing a semiconductor device comprising:
forming a semiconductor substrate;
forming a first dielectric layer on the semiconductor substrate;
forming a light modulator and a first waveguide in the first dielectric layer;
forming a second dielectric layer on the first dielectric layer;
forming a first recess and a second recess in the second dielectric layer;
forming a heater in the second dielectric layer and a first conductive contact in the second dielectric layer by filling a first material in the first recess and in the second recess, wherein a first top surface of the first dielectric layer is coplanar with a second top surface of the first waveguide and a third top surface of the light modulator.

20. The method of claim 19, wherein a first depth of the first recess is different than the second depth of the second recess, and wherein the first material includes tungsten (W).

* * * * *